United States Patent
Shiraishi et al.

(10) Patent No.: US 6,294,632 B1
(45) Date of Patent: Sep. 25, 2001

(54) BIAXIALLY ORIENTED POLYPROPYLENE FILM

(75) Inventors: Yasuhiro Shiraishi; Yuji Ando; Noriaki Saito, all of Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/230,254

(22) PCT Filed: Jul. 22, 1997

(86) PCT No.: PCT/JP97/02533

§ 371 Date: Jan. 22, 1999

§ 102(e) Date: Jan. 22, 1999

(87) PCT Pub. No.: WO98/03579

PCT Pub. Date: Jan. 29, 1998

(30) Foreign Application Priority Data

Jul. 24, 1996 (JP) .................................................. 8-214249

(51) Int. Cl.$^7$ ...................................................... C08F 10/00
(52) U.S. Cl. ........................................ 526/348.1; 526/351
(58) Field of Search ................................ 526/348.1, 351

(56) References Cited

U.S. PATENT DOCUMENTS

| | | | |
|---|---|---|---|
| 5,254,393 | 10/1993 | Murschall et al. | 428/212 |
| 5,777,055 | * | 7/1998 | Peiffer et al. ...................... 526/348.1 |

FOREIGN PATENT DOCUMENTS

| | | |
|---|---|---|
| 717043 | 3/1995 | (JP) . |
| 7241906 | 9/1995 | (JP) . |
| 8119292 | 5/1996 | (JP) . |
| 9169050 | 6/1997 | (JP) . |

OTHER PUBLICATIONS

Patent Cooperation Treaty (PCT) International Preliminary Examination Report of PCT/JP97/02533 (English Translation).

* cited by examiner

*Primary Examiner*—David W. Wu
*Assistant Examiner*—William K Cheung
(74) *Attorney, Agent, or Firm*—Leydig, Voit & Mayer, Ltd.

(57) ABSTRACT

A biaxially oriented polypropylene film which has a melt flow rate (MFR) of from 1 to 12 g/10 min and in which the melt viscosity thereof as measured with a rotational rheometer at a shear rate of 0 rad/sec ($\eta 0$), the melt viscosity thereof as measured with the rheometer at a shear rate of 10 rad/sec ($\eta 10$), and the MFR thereof satisfy the relationship $$\log[(\eta 0 - \eta 10)/\eta 10] + 0.7 \log MFR \leq 0.7$$

The biaxially oriented polypropylene film has, when subjected to heat sealing/cutting, a high sealing strength at the heat-sealed part and reduced fluctuations in sealing strength, has excellent stiffness suitable for bag-forming and filling and sealing, and is excellent in transparency and gloss.

4 Claims, No Drawings

BIAXIALLY ORIENTED POLYPROPYLENE FILM

TECHNICAL FIELD

The present invention relates to a biaxially oriented polypropylene film. More particularly, the present invention relates to a biaxially oriented polypropylene film which, when subjected to heat sealing/cutting, has a high sealing strength at the heat-sealed part and reduced fluctuations in sealing strength, and which has excellent stiffness suitable for bag-forming and filling and sealing, and has excellent transparency and gloss.

BACKGROUND ART

Biaxially oriented polypropylene films (hereinafter referred to as OPP films) are typical of polyolefin films. Because of their excellent transparency and gloss, OPP films are used as packaging materials in a wide range of fields. OPP films further have high rigidity, and hence have excellent printability and excellent suitability for bag-forming and filling operations. However, when the conventional OPP films are used in bag-forming by heat sealing/cutting, the heat-sealed parts have a low sealing strength and large fluctuations in sealing strength. Conventional OPP films therefore are disadvantageous in, for example, that bag breakage is apt to occur during filling and sealing, and also apt to occur due to vibration during the transportation or handling of the packages.

Under these circumstances, a multilayered OPP film comprising an OPP film having a heat-sealable layer has been proposed (see JP-B-7-17043). (The term "JP-B" as used herein means an "examined Japanese patent publication".) However, the proposed film having a low-melting heat-sealable layer also has large fluctuations in heat-sealing strength and are apt to develop pinholes in parts having a low heat-sealing strength. Thus, the proposed film has a problem that it is unsuitable for use in food packaging for which airtightness is required.

In addition, an OPP film for heat sealing, employing an ethylene/propylene copolymer or an ethylene/propylene/butene copolymer has been proposed (see JP-A-7-241906). (The term "JP-A" as used herein means an "unexamined published Japanese patent application".) However, the OPP films employing either of these copolymers are both inferior in stiffness as compared to conventional OPP films and hence have a problem that the suitability thereof for bag-forming and filling operations is reduced.

DISCLOSURE OF THE INVENTION

The present invention has been made taking the above described problems in conventional techniques into consideration and, therefore, an object thereof is to provide a biaxially oriented polypropylene film which, when subjected to heat sealing/cutting, has a high sealing strength at the heat-sealed part and reduced fluctuations in sealing strength, and which has excellent stiffness suitable for bag-forming and filling and sealing, and has excellent transparency and gloss.

The present invention relates to the following biaxially oriented polypropylene films (1) to (3).

(1) A biaxially oriented polypropylene film which has a melt flow rate of from 1 to 12 g/10 min and in which the melt viscosity thereof as measured with a rotational rheometer at a shear rate of 0 rad/sec ($\eta 0$), the melt viscosity thereof as measured with the rheometer at a shear rate of 10 rad/sec ($\eta 10$), and the MFR thereof satisfy the following relationship (1):

$$\log[(\eta 0 - \eta 10)/\eta 10] + 0.7 \log MFR \leq 0.7 \quad (1).$$

(2) The biaxially oriented polypropylene film as described in (1) above, which has a half-crystallization time at 120° C. of from 80 to 200 seconds as measured with a crystallization rate analyzer based on depolarization intensity.

(3) The biaxially oriented polypropylene film as described in (1) above, which has a density of from 0.890 to 0.920 g/cm$^3$.

BEST MODE FOR CARRYING OUT THE INVENTION

The present invention is explained in detail below.

The biaxially oriented polypropylene film of the present invention has a melt flow rate (hereinafter often abbreviated as an "MFR") (measured at 230° C., 21.18 N) of from 1 to 12 g/10 min, and further the melt viscosity of the film as measured with a rotational rheometer at a shear rate of 0 rad/sec ($\eta 0$), the melt viscosity thereof as measured with the rheometer at a shear rate of 10 rad/sec ($\eta 10$), and the MFR thereof satisfy the following relationship (1):

$$\log[(\eta 0 - \eta 10)/\eta 10] + 0.7 \log MFR \leq 0.7 \quad (1).$$

OPP films having an MFR far lower than 1 g/10 min are undesirable in that they have a reduced heat-sealing strength. OPP films having an MFR far higher than 12 are undesirable in that heat sealing thereof results in sealed parts having a poor appearance (flashes are generated in the heat sealing).

The value of MFR is determined by finely cutting the biaxially oriented polypropylene film and analyzing the cut film in accordance with JIS K 7210 under conditions 14 (230° C., 21.1 N). The unit thereof is expressed by g/10 min.

Relationship (1) given above means that when OPP films having the same MFR are compared, the film which has an $\eta 0/\eta 10$ ratio closer to 1, in other words, which exhibits less change in melt viscosity with respect to shear rate change, has better heat sealability. If the value of $$\log[(\eta 0 - \eta 10)/\eta 10] + 0.7 \log MFR$$

is far larger than 0.7, fluctuations in heat-sealing strength become increased and this causes pinhole generation.

$\eta 10$ indicates the value of melt viscosity as measured at a shear rate of 10 rad/sec with rotational rheometer RDS-7700 Spectrometer (manufactured by Rheometrics Inc.). $\eta 0$ is the value determined by using the Ellis's nonlinear equation described in Christoher W. Macosko, *Rheology* from melt viscosity values obtained in the shear rate range of from 0.1 to 500 rad/sec with RDS-7700.

The biaxially oriented polyolefin film of the present invention is obtained from a polypropylene while controlling the MFR, $\eta 0$, and $\eta 10$ thereof. Examples of the methods for controlling these properties include the following.

(1) A method in which when a polypropylene to be used is produced through polymerization, the MFR and molecular weight distribution of the polypropylene are controlled to thereby obtain from the polypropylene an OPP film satisfying the requirements concerning MFR, $\eta 0$, and $\eta 10$.

(2) A method in which when the polypropylene to be used is melt-kneaded together with additives such as an antioxidant and then pelletized, the MFR of the polymer is controlled by regulating the conditions for melt kneading, e.g., the screw design of the extruder and the temperature for extrusion, or by adding an organic peroxide or the like, whereby an OPP film satisfying the requirements concerning MFR, $\eta 0$, and $\eta 10$ is obtained. When the ratio of the MFR as measured after the melt kneading to the MFR of the polypropylene used becomes high, the η0/η10 ratio becomes close to 1.

(3) A method in which MFR is controlled during OPP film production by regulating the screw design of the extruder, the temperature for extrusion, etc. to thereby obtain an OPP film satisfying the requirements concerning MFR, η0, and η10. Specifically, an OPP film obtained by using an extruder with employing a high-shear screw at a high extrusion temperature has a high MFR and an η0/η10 ratio close to 1.

The biaxially oriented polyolefin film of the present invention preferably has a half-crystallization time at 120° C. of from 80 to 200 seconds, because such a film is excellent in heat-sealing strength and in the appearance of heat-sealed parts.

The half-crystallization time of a film is determined as follows. A film is analyzed with crystallization rate analyzer MK-801 based on depolarization intensity (manufactured by Kotaki Seisakusho K.K., Japan) to measure the change of the quantity of transmitted light at 120° C. (isothermally) until the termination of crystallization. The time at which the change of the quantity of transmitted light becomes the half of the change up to the termination of crystallization is taken as the half-crystallization time. The unit thereof is second.

Examples of methods for controlling the half-crystallization time of the OPP film of the present invention include the following.

(1) A method in which when the polypropylene to be used is produced through polymerization, the stereoregularity and melting point of the polypropylene are controlled to thereby obtain an OPP film having a half-crystallization time within the predetermined range. Propylene homopolymers having a high melting point have a reduced half-crystallization time, while copolymers of propylene with other monomers such as ethylene have a prolonged half-crystallization time.

(2) A method in which when the polypropylene to be used is melt-kneaded together with additives such as an antioxidant and then pelletized, the rate of crystallization of the polymer is controlled by using a nucleating agent, etc., whereby an OPP film having a half-crystallization time within the predetermined range is obtained. Addition of a sorbitol nucleating agent and the like results in a reduced half-crystallization time.

The biaxially oriented polypropylene film of the present invention preferably has a density of from 0.890 to 0.920 g/cm³, because such a film has high stiffness and an excellent heat-sealing strength.

The density of a film used in the present invention is determined as follows. An Abbe's refractometer employing benzyl alcohol as a film mounting liquid is used to measure the machine direction refractive index (nx) of the film, the transverse direction refractive index (ny) thereof, and the normal direction refractive index (nz) thereof. The density of the film is determined from these refractive index values using the following equations.

Density(ρ)=(niso−0.9353)/0.6293 niso=(nx+ny+nz)/3

Examples of methods for controlling the density include the following.

(1) A method in which when the polypropylene to be used is produced through polymerization, the stereoregularity of the polymer is controlled to thereby obtain an OPP film having a density within the predetermined range. In general, OPP films obtained from a polypropylene having high stereoregularity have a high density.

(2) A method in which density is controlled during OPP film production by regulating the stretching temperature, stretch ratio, etc. to thereby obtain an OPP film. OPP films formed under conditions of low stretching temperatures and high stretch ratios have a high density.

The polypropylene for use in the present invention is not particularly limited. Examples thereof include not only propylene homopolymers, but also include ethylene/propylene copolymers, propylene/butene copolymers, ethylene/propylene/butene copolymers, and copolymers of propylene with other α-olefins. Mixtures of these polymers may also be used. Furthermore, a homo- or copolymer of an olefin other than propylene may be contained in the polypropylene in admixture. The polypropylene for use in the present invention preferably has a propylene content of 98.5% by weight or higher, more preferably from 99.0 to 99.8% by weight.

Additives such as, e.g., antioxidant, inorganic filler, lubricant and antiblocking agent can be suitably incorporated into the polypropylene for use in the present invention if desired and necessary, as long as the additive used does not impair the objects of the present invention.

The biaxially oriented polypropylene film of the present invention is a film biaxially stretched by a conventionally known stretching technique such as, e.g., the tubular method or the tenter method. The stretch ratios of the film are not particularly limited. However, from the standpoint of obtaining excellent stiffness, the stretch ratio in the machine direction is preferably from 3 to 6 times, more preferably from 4.0 to 5.5 times, and that in the transverse direction is preferably from 6 to 10 times, more preferably from 7.0 to 9.0 times.

The thickness of the OPP film of the present invention is not particularly limited, and may be selected depending on the intended use of the film. However, the thickness thereof is usually from 5 to 100 μm, preferably from 10 to 60 μm.

The OPP film of the present invention may be a single-layer film, or may be a laminated film comprising two or more layers. For packaging weighty vegetables or fruits, the OPP film is preferably a laminated film having as a surface layer a layer of a copolymer having a low melting point of propylene with, e.g., ethylene.

EXAMPLES

The present invention will be explained below in more detail with reference to the following Examples and Comparative Examples, but the invention should not be construed as being limited thereto.

The properties shown in the Examples and Comparative Examples were determined by the following methods and evaluated based on the following criteria.

(1) MFR (unit: g/10 min)

The melt flow index of any of polypropylenes, compositions, and OPP films were determined in accordance with JIS K 7210 under conditions 14 (230° C., 21.2 N).

(2) Melting point (hereinafter referred to as m.p.; unit: ° C.)

A 10-mg sample was heated in a nitrogen atmosphere using differential scanning calorimeter DSC Type 7 (manufactured by Perkin-Elmer Corp.) from 20° C. to 230° C. at a rate of 20° C./min. Subsequently, the sample was kept at 230° C. for 10 minutes and then cooled to −20° C. at a rate of 5° C./min. The cooled sample was kept at −20° C. for 10 minutes and then heated at a rate of 20° C./min to obtain an endothermic curve, from which the peak temperature of the endothermic curve was determined.

(3) Isotactic index (hereinafter referred to as II; unit: %)

The proportion by weight of the extraction residue resulting from 6-hour extraction with boiling heptane in a Kumagawa's extractor.

(4) Number-average molecular weight (hereinafter referred to as $M_n$) and weight-average molecular weight (hereinafter referred to as $M_w$) of polypropylene The molecular weights were measured with gel permeation chromatograph WATERS C150 (manufactured by Waters Inc.) at a sample concentration of 0.5 mg/ml in o-dichlorobenzene solvent.

Column used: PSK Gel GMH-HT (trade name; manufactured by Tosoh Corp., Japan), 7.5 mm×600 mm Temperature for measurement: 135° C.

Flow rate: 1.0 ml/min (5) Monomer unit contents of polypropylene (unit: wt %)

A sample was analyzed with FT-NMR spectrometer GX-270 (manufactured by JEOL Ltd., Japan) by $^{13}$C-NMR spectrometry, and the contents of the components were calculated through integrations from the areas of the corresponding peaks.

Observation width: 12,000 Hz

Pulse angle: 35°

Pulse interval: 4.5 seconds

Temperature for measurement: 130° C.

Solvent: mixture of o-dichlorobenzene and a deuterated bromobenzene (bromobenzene d5)

Number of integrations: ≧10,000

(6) Half-crystallization time (unit: sec)

A 100-μm pressed film obtained by pressing an OPP film with a 200° C. pressing machine at a pressure of 9.8 MPa for 30 seconds and then cooling the film at 25° C. for 10 seconds was used as a test sample. The pressed film was kept at 230° C. for 5 minutes using crystallization rate analyzer NK-801 based on depolarization intensity (manufactured by Kotaki Seisakusho K.K.) to melt the film. The molten substance was kept at 120° C. (isothermally) to measure the change of the quantity of transmitted light until the termination of crystallization. The time at which the change of the quantity of transmitted light becomes the half of the change up to the termination of crystallization was taken as the half-crystallization time.

(7) Density (unit: g/cm³)

An Abbe's refractometer employing benzyl alcohol as a film mounting liquid was used to measure the machine direction refractive index (nx) of a film, the transverse direction refractive index (ny) thereof, and the normal direction refractive index (nz) thereof. The density of the film was determined from these refractive index values using the following equations.

$$\text{Density}(\rho) = (\text{niso} - 0.9353)/0.6293$$

$$\text{niso} = (nx + ny + nz)/3$$

(8) Heat-sealing strength (unit: N/15 mm)

A bag-forming machine equipped with 350° C. heat-sealing bars was used to produce bags at a rate of eighty bags per minute. With respect to each film sample, the heat-sealing strength of the sealed part was examined with n=20 to determine the minimum, maximum and average values. The OPP films giving bags which have a high average heat-sealing strength value and a small difference between the maximum and minimum values and are free from flash generation during heat sealing have good heat sealability. The state of flash was visually observed.

(9) Young's modulus (unit: MPa)

The machine direction Young's modulus of an OPP film was measured in accordance with ASTM D 523. The higher the Young's modulus, the more the film is rigid.

(10) Haze (unit: %)

Haze was measured in accordance with ASTM D 1003. The smaller the value of haze, the better the transparency.

(11) Gloss (unit: %)

Gloss was measured in accordance with ASTM D 523. The higher the gloss, the more the film is glossy.

The following abbreviations were used for the polypropylenes and additives used in the Examples and Comparative Examples.

PP1: Polypropylene which is a propylene homopolymer having an II of 98.4, an $M_w/M_n$ of 3.8, an MFR of 0.7 g/10 min, and an m.p. of 164° C.

PP2: Polypropylene which is an ethylene/propylene copolymer having an II of 97.0, an $M_w/M_n$ of 4.5, an MFR of 0.5 g/10 min, an m.p. of 161° C., and an ethylene content of 0.2 wt %.

PP3: Polypropylene which is a butene-1/propylene copolymer having an II of 97.0, an $M_w/M_n$ of 4.5, an MFR of 1.0 g/10 min, an m.p. of 160° C., and a butene-1 content of 1.2 wt %.

PP4: Polypropylene which is an ethylene/propylene copolymer having an II of 96.5, an $M_w/M_n$ of 4.3, an MFR of 1.2 g/10 min, an m.p. of 160° C., and an ethylene content of 0.4 wt %.

PP5: Polypropylene which is an ethylene/propylene copolymer having an II of 97.4, an $M_w/M_n$ of 4.2, an MFR of 0.13 g/10 min, an m.p. of 161° C., and an ethylene content of 0.2 wt %.

PP6: Polypropylene which is a propylene homopolymer having an II of 97.9, an $M_w/M_n$ of 4.5, an MFR of 3.3 g/10 min, and an m.p. of 164° C.

PP7: Polypropylene which is an ethylene/propylene copolymer having an II of 95.6, an $M_w/M_n$ of 4.5, an MFR of 2.3 g/10 min, an m.p. of 161° C., and an ethylene content of 0.2 wt %.

PP8: Polypropylene which is an ethylene/propylene copolymer having an II of 92.8, an $M_w/M_n$ of 3.8, an MFR of 4.0 g/10 min, an m.p. of 157° C., and an ethylene content of 1.2 wt %.

A: Tris(2,4-di-t-butylphenyl) phosphite

B: Tetrakis[methylene-3-(3',5'-di-t-butyl-4'-hydroxyphenyl)propionate]methane

C: Butylated hydroxytoluene

D: Calcium stearate

E: 2,5-Dimethyl-2,5-di(t-butylperoxy)hexane

F: Dibenzylidenesorbitol

Compositions 1 to 10 used in the Examples and Comparative Examples were obtained as follows.

Additives A to F were added to the polypropylenes (PP1 to PP8) as shown in Table 1 below in the respective concentrations shown therein. Each resultant mixture was treated with a Henschel mixer, and then melt-kneaded at the granulation temperature shown in Table 1. Thus, pellet-form compositions (Compositions 1 to 10) were obtained. The MFR and half-crystallization time of each composition are shown in Table 1.

Example 1

Composition 1 was used to produce an original film at an extrusion temperature of 250° C. The original film obtained was stretched in the machine direction at 143° C. by 4.5 times and then in the transverse direction at 165° C. by 9.0 times to produce an OPP film having a thickness of 30 μm. The OPP film obtained was examined for MFR, η0, η10, half-crystallization time, density, heat-sealing strength, Young's modulus, haze, and gloss. The results obtained are shown in Table 2 below.

Example 2

Composition 2 was used to produce an original film at an extrusion temperature of 270° C. The original film obtained was stretched in the machine direction at 145° C. by 4.8 times and then in the transverse direction at 168° C. by 8.5 times to produce an OPP film having a thickness of 30 μm. The OPP film obtained was examined for MFR, η0, η10, half-crystallization time, density, heat-sealing strength, Young's modulus, haze, and gloss. The results obtained are shown in Table 2 below.

Example 3

Composition 3 was used to produce an original film at an extrusion temperature of 250° C. The original film obtained was stretched in the machine direction at 145° C. by 4.5 times and then in the transverse direction at 168° C. by 8.5 times to produce an OPP film having a thickness of 30 μm. The OPP film obtained was examined for MFR, η0, η10, half-crystallization time, density, heat-sealing strength, Young's modulus, haze, and gloss. The results obtained are shown in Table 2 below.

Example 4

Composition 4 was used to produce an original film at an extrusion temperature of 300° C. The original film obtained was stretched in the machine direction at 143° C. by 4.5 times and then in the transverse direction at 165° C. by 8.5 times to produce an OPP film having a thickness of 30 μm. The OPP film obtained was examined for MFR, η0, η10, half-crystallization time, density, heat-sealing strength, Young's modulus, haze, and gloss. The results obtained are shown in Table 2 below.

Comparative Example 1

Composition 5 was used to produce an OPP film having a thickness of 30 μm, under the same conditions as in Example 1. The OPP film obtained was examined for MFR, η0, η10, half-crystallization time, density, heat-sealing strength, Young's modulus, haze, and gloss. The results obtained are shown in Table 2 below.

Comparative Example 2

Composition 6 was used to produce an OPP film having a thickness of 30 μm, under the same conditions as in Example 1. The OPP film obtained was examined for MFR, η0, η10, half-crystallization time, density, heat-sealing strength, Young's modulus, haze, and gloss. The results obtained are shown in Table 2 below.

Comparative Example 3

Composition 7 was used to produce an OPP film having a thickness of 30 μm, under the same conditions as in Example 1. The OPP film obtained was examined for MFR, η0, η10, half-crystallization time, density, heat-sealing strength, Young's modulus, haze, and gloss. The results obtained are shown in Table 2 below.

Comparative Example 4

Composition 8 was used to produce an OPP film having a thickness of 30 μm, under the same conditions as in Example 1. The OPP film obtained was examined for MFR, η0, η10, half-crystallization time, density, heat-sealing strength, Young's modulus, haze, and gloss. The results obtained are shown in Table 2 below.

Comparative Example 5

Composition 9 was used to produce an OPP film having a thickness of 30 μm, under the same conditions as in Example 1. The OPP film obtained was examined for MFR, η0, η10, half-crystallization time, density, heat-sealing strength, Young's modulus, haze, and gloss. The results obtained are shown in Table 2 below.

Comparative Example 6

Composition 10 was used to produce an OPP film having a thickness of 30 μm, under the same conditions as in Example 1. The OPP film obtained was examined for MFR, η0, η10, half-crystallization time, density, heat-sealing strength, Young's modulus, haze, and gloss. The results obtained are shown in Table 2 below.

Comparative Example 7

Composition 2 was used to produce an original film at an extrusion temperature of 250° C. The original film obtained was stretched in the machine direction at 143° C. by 2.5 times and then in the transverse direction at 165° C. by 8.5 times to produce an OPP film having a thickness of 30 μm. The OPP film obtained was examined for MFR, η0, η10, half-crystallization time, density, heat-sealing strength, Young's modulus, haze, and gloss. The results obtained are shown in Table 2 below.

Comparative Example 8

Composition 1 was used to produce an original film at an extrusion temperature of 250° C. The original film obtained was stretched in the machine direction at 145° C. by 7.0 times and then in the transverse direction at 168° C. by 9.0 times to produce an OPP film having a thickness of 30 μm. The OPP film obtained was examined for MFR, η0, η10, half-crystallization time, density, heat-sealing strength, Young's modulus, haze, and gloss. The results obtained are shown in Table 2 below.

TABLE 1

| | Polypropylene used | Additives *1) | | | | Granulation temperature | MFR | Half-crystallization time |
|---|---|---|---|---|---|---|---|---|
| Composition 1 | PP1 | A/0.10 wt % | B/0.10 wt % | D/0.10 wt % | E/0.02 wt % | 230 | 3.3 | 91 |
| Composition 2 | PP2 | A/0.10 wt % | B/0.10 wt % | D/0.10 wt % | E/0.02 wt % | 230 | 2.3 | 126 |
| Composition 3 | PP3 | B/0.05 wt % | C/0.10 wt % | D/0.10 wt % | | 300 | 5.0 | 152 |
| Composition 4 | PP4 | A/0.10 wt % | B/0.10 wt % | D/0.10 wt % | | 230 | 1.3 | 161 |
| Composition 5 | PP5 | A/0.10 wt % | B/0.10 wt % | D/0.10 Wt% | E/0.02 wt % | 230 | 0.7 | 150 |

TABLE 1-continued

| | Polypropylene used | Additives *1) | | | | | Granulation temperature | MFR | Half-crystallization time |
|---|---|---|---|---|---|---|---|---|---|
| Composition 6 | PP6 | A/0.10 wt % | B/0.10 wt % | D/0.10 Wt% | E/0.023 wt % | | 230 | 19.5 | 95 |
| Composition 7 | PP6 | A/0.10 wt % | B/0.10 wt % | D/0.10 wt % | | | 230 | 3.3 | 95 |
| Composition 8 | PP7 | A/0.10 wt % | B/0.10 wt % | D/0.10 wt % | | | 230 | 2.3 | 130 |
| Composition 9 | PP1 | A/0.10 wt % | B/0.10 wt % | D/0.10 wt % | E/0.023 wt % | F/0.10 wt % | 230 | 3.3 | 65 |
| Composition 10 | PP8 | A/0.10 wt % | B/0.10 wt % | D/0.10 wt % | | | 230 | 4.1 | 230 |

*1)
A: Tris(2,4-di-t-butylphenyl)phosphite
B: Tetrakis(methylene-3-(3,,5'-di-t-butyl-4'-hydroxyphenyl)propionate/methane
C: Butylated hydroxytoluene
D: Calcium stearate
E: 2,5-Dimethyl-2,5-di(t-butylperoxy)hexane
F: Dibensylideneaorbitol

TABLE 2

| | Composition used | MFR | $\eta_0$ | $\eta_{10}$ | R*1) | Half-crystallization time | Density |
|---|---|---|---|---|---|---|---|
| Ex. 1 | Composition 1 | 4.0 | $6.98 \times 10^4$ | $2.79 \times 10^4$ | 0.60 | 91 | 0.912 |
| Ex. 2 | Composition 2 | 3.3 | $8.11 \times 10^4$ | $3.00 \times 10^4$ | 0.59 | 128 | 0.907 |
| Ex. 3 | Composition 3 | 6.2 | $3.04 \times 10^4$ | $1.45 \times 10^4$ | 0.60 | 155 | 0.908 |
| Ex. 4 | Composition 4 | 6.0 | $3.36 \times 10^4$ | $1.46 \times 10^4$ | 0.66 | 160 | 0.905 |
| Comp. Ex. 1 | Composition 5 | 0.8 | $4.97 \times 10^5$ | $8.02 \times 10^4$ | 0.65 | 153 | 0.908 |
| Comp. Ex. 2 | Composition 6 | 19.8 | $6.82 \times 10^3$ | $4.87 \times 10^3$ | 0.51 | 92 | 0.911 |
| Comp. Ex. 3 | Composition 7 | 6.1 | $5.17 \times 10^4$ | $1.62 \times 10^4$ | 0.89 | 94 | 0.912 |
| Comp. Ex. 4 | Composition 8 | 4.1 | $9.18 \times 10^4$ | $2.48 \times 10^4$ | 0.86 | 132 | 0.906 |
| Comp. Ex. 5 | Composition 9 | 4.0 | $6.98 \times 10^4$ | $2.79 \times 10^4$ | 0.60 | 64 | 0.919 |
| Comp. Ex. 6 | Composition 10 | 7.5 | $3.83 \times 10^4$ | $1.74 \times 10^4$ | 0.69 | 230 | 0.895 |
| Comp. Ex. 7 | Composition 2 | 3.3 | $8.11 \times 10^4$ | $3.00 \times 10^4$ | 0.59 | 126 | 0.883 |
| Comp. Ex. 8 | Composition 1 | 4.0 | $6.98 \times 10^4$ | $2.79 \times 10^4$ | 0.60 | 93 | 0.925 |

| | Heat sealability | | | | | | |
|---|---|---|---|---|---|---|---|
| | Average sealing strength | Maximum | Minimum | Flash generation | Young's modulus | Haze | Gloss |
| Ex. 1 | 31 | 34 | 25 | o | 2250 | 0.6 | 152 |
| Ex. 2 | 34 | 36 | 29 | o | 1960 | 0.6 | 152 |
| Ex. 3 | 33 | 35 | 27 | o | 2000 | 0.6 | 152 |
| Ex. 4 | 35 | 39 | 29 | o | 1880 | 0.6 | 152 |
| Comp. Ex. 1 | 28 | 32 | 12 | o | 2000 | 0.8 | 147 |
| Comp. Ex. 2 | 31 | 34 | 26 | x | 2220 | 0.7 | 150 |
| Comp. Ex. 3 | 27 | 33 | 12 | o | 2250 | 0.8 | 147 |
| Comp. Ex. 4 | 31 | 37 | 16 | o | 1950 | 0.7 | 150 |
| Comp. Ex. 5 | 24 | 29 | 20 | o | 2400 | 0.5 | 154 |
| Comp. Ex. 6 | 29 | 33 | 20 | x | 1550 | 0.9 | 142 |
| Comp. Ex. 7 | 30 | 34 | 25 | x | 1100 | 2.5 | 130 |
| Comp. Ex. 8 | 25 | 29 | 21 | o | 2480 | 0.6 | 152 |

*1)$R = \log[(\eta_0 - \eta_{10}] + 0.7 \log MFR$

As is apparent from the results in Table 2, it is understood that the OPP films obtained in Examples 1 to 4 each is excellent in all of heat sealability, Young's modulus (stiffness), haze (transparency), and gloss. It is also understood that the OPP films of Comparative Examples 1 to 4 and Reference Examples 1 and 4 were inferior in heat sealability, the OPP film of Reference Example 2 was inferior in heat sealability and Young's modulus (stiffness), and that the OPP film of Reference Example 3 was inferior in heat sealability, Young's modulus (stiffness), and haze (transparency).

INDUSTRIAL APPLICABILITY

The biaxially oriented polypropylene film of the present invention has a high heat-sealing strength, reduced fluctuations in sealing strength, and excellent stiffness suitable for bag-forming and filling and sealing. The film is therefore suitable for use as a base material for food packaging, textile packaging, the packaging of weighty vegetables or fruits, etc.

What is claimed is:

1. A biaxially oriented polypropylene film which has a melt flow rate (MFR) of from 1 to 12 g/10 min and in which the melt viscosity $\eta 0$, as measured with a rotational rheometer at a shear rate of 0 rad/sec, the melt viscosity $\eta 10$, as measured with the rheometer at a shear rate of 10 rad/sec, and the MFR satisfy the relationship $$\log[(\eta 0 - \eta 10)/\eta 10] + 0.7 \log MFR \leq 0.7$$

wherein the biaxially oriented polypropylene film has a half-crystallization time at 120° C. of from 80 to 200 seconds as measured with a crystallization rate analyzer based on depolarization intensity and a density of from 0.890 to 0.920 g/cm$^3$.

2. A biaxially oriented polypropylene film consisting essentially of a polymer of propylene and having a melt flow rate (MFR) of from 1 to 12 g/10 min and in which the melt viscosity $\eta 0$, as measured with a rotational rheometer at a shear rate of 0 rad/sec, the melt viscosity $\eta 10$, as measured with the rheometer at a shear rate of 10 rad/sec, and the MFR satisfy the relationship $$\log[(\eta 0 - \eta 10)/\eta 10] + 0.7 \log MFR \leq 0.7.$$

3. The biaxially oriented polypropylene film of claim 2, which has a half-crystallization time at 120° C. of from 80 to 200 seconds as measured with a crystallization rate analyzer based on depolarization intensity.

4. The biaxially oriented polypropylene film of claim 2, which has a density of from 0.890 to 0.920 g/cm$^3$.

* * * * *